United States Patent Office 3,284,190
Patented Nov. 8, 1966

3,284,190
SEPARATION OF URANIUM FROM NOBLE AND REFRACTORY METALS
James B. Knighton, Joliet, and Robert K. Steunenberg, Naperville, Ill., assignors to the United States of America as represented by the United States Atomic Energy Commission
No Drawing. Filed Feb. 8, 1966, Ser. No. 526,329
7 Claims. (Cl. 75—84.1)

The invention described herein was made in the course of, or under, a contract with the United States Atomic Energy Commission.

This invention relates to the separation of substances from one another and more particularly relates to the separation of uranium values from noble metals and refractory metals.

This case is related to assignee's companion application S. N. 526,328, filed February 8, 1966, for the separation of plutonium from uranium and refractory metals and noble metals present as fission products resulting from the irradiation of nuclear reactor fuel and nuclear blanket material.

In the companion case, irradiated nuclear reactor fuel and irradiated nuclear blanket material, from which the rare earth fission products have previously been removed, was added to a molten magnesium alloy. A part of the uranium precipitated out while the plutonium values and refractory metals and noble metals remained in the alloy. The plutonium was then removed from the salt by contacting it with molten chloride salt which selectively oxidized the plutonium to plutonium chloride which is soluble in the molten salt. The molten salt was then contacted with a molten-zinc-magnesium alloy which reduced the plutonium chloride to plutonium which precipitated in the alloy as a plutonium-zinc intermetallic compound.

Although most of the uranium present in the reactor fuel or blanket material will precipitate out in the magnesium alloy of the companion case, it is difficult to filter the precipitate from the supernatant liquid and achieve a satisfactory degree of purity of uranium recovered.

Therefore, it is one object of the present invention to recover uranium from the molten magnesium alloy in which the process of the companion case leaves it.

It is another object of this invention to provide a process for separating uranium values from refractory metals and noble metals.

It is a further object of this invention to provide a method of separation of uranium values from irradiated nuclear reactor fuel and irradiated nuclear blanket material containing refractory metals and noble metals present as fission products where the original composition of the fuel material is unimportant.

The process of this invention comprises adding the irradiated nuclear reactor fuel or reactor blanket material from which the rare earth fission products and plutonium values have already been removed to a molten copper-magnesium alloy. The magnesium content is adjusted to 4–8 weight percent of the alloy containing the fission products and uranium, and the alloy is contacted with a molten alkali or alkaline earth chloride salt which selectively oxides the uranium to uranium chloride which is soluble in the molten salt and which dissolves therein. The molten salt is in turn brought into contact with a molten magnesium-zinc alloy which acts as a scrubber solution and which reduces the uranium chloride to metallic uranium which has a low solubility in the molten magnesium-zinc alloy and precipitates out and as such may easily be recovered from the alloy.

The starting material which may be used for the process of this invention may be the oxides, halides or the metallic form. The carbides may also be used, although it is first necessary to oxidize or chlorinate the carbide before the addition of it to the copper-magnesium alloy.

In order to achieve an efficient separation of uranium from the alloy and the fission products present therein, it is found necessary to maintain the percentage of magnesium present in the alloy to rather narrow limits. The concentration of magnesium in the alloy when the uranium and fission products are present should be from 4–8 weight percent.

Less than this amount will present a problem of fluidity of the alloy when used at the temperatures indicated. When more magnesium is added to the alloy, it decreases the solubility of uranium in the alloy and decreases the distribution coefficient. This in turn lowers the amount of uranium which will be taken up in the salt phase. A higher distribution coefficient and uranium solubility produce a greater efficiency of the separation process.

Magnesium chloride was found to be most satisfactory as the molten salt. However, alkali metal chlorides or alkaline earth metal chlorides may be used as diluents, although the molten chloride mixture should be rich in magnesium cations, to obtain a greater transfer of uranium from the copper-magnesium alloy into the molten salt.

The scrubber alloy with which the molten salt containing the dissolved uranium chloride is contacted is a magnesium alloy containing from 30 to 65 weight percent of zinc. The uranium chloride in the salt, when contacted with this alloy, is reduced by it to metallic uranium which is insoluble in the molten salt and relatively insoluble in the molten magnesium alloy where it precipitates. The uranium may then be easily recovered from the molten alloy, for example by decanting the supernatant liquid leaving the free uranium and/or by retorting.

Because of the effect of magnesium, in the copper alloy, on the solubility of uranium and the uranium distribution coefficient, it is important that the magnesium concentration be maintained within the narrow limits given in order for the process of this invention to operate effectively. This concentration is difficult to maintain without constant monitoring of the alloy due to the magnesium released when the uranium is oxidized to uranium chloride by magnesium chloride contained in the magnesium-cation-rich alkali or alkaline earth chloride. It was found that, by maintaining surplus metallic copper in contact with the liquid copper-magnesium alloy, the surplus copper would dissolve as the magnesium concentration in the alloy started to increase, and by so doing maintained the magnesium concentration in the copper-magnesium alloy at a near constant weight percent.

The temperatures necessary for the process of this invention are dictated by the solubility of the uranium in the alloy and also by the melting temperatures of the alloys and the molten salt. It was found that temperatures in the range of from 725° C. to 850° C. were satisfactory to practice this invention with the alloys and salts given.

Either a tungsten or a tantalum crucible can be used to carry out the separation process, in addition to other materials known to those skilled in the art. The separation can be carried out in an ambient atmosphere of air. However, where the crucible material reacts at the elevated temperature with air, the use of an inert atmosphere such as argon or helium is necessary.

The process of this invention may be carried out in a number of ways. For example, it can be carried out by using a single container divided to maintain separation of the two molten alloys, with the molten salt on top simultaneously in contact with both alloys and with the mixing accomplished by a stirring device. In another method, the alloys could be kept separate in two individual crucibles and the molten salt cycled by a heated pipe so that it contacted first one alloy and then the other.

The following two examples are given for illustrative purposes of the method of this invention.

Example I

A mixture of oxides of uranium, cerium, zirconium, molybdenum and ruthenium is suspended in a molten salt of 30 mole percent $MgCl_2$, 30 mole percent NaCl and 40 percent KCl at 800° C. in an atmosphere of argon. The uranium, zirconium and noble metals are reduced from suspension by a molten alloy of 8 weight percent magnesium in copper in a tungsten crucible. The copper-magnesium alloy is then contacted intermittently with a molten $MgCl_2$ salt which oxidizes the uranium to uranium chloride and which transports the uranium chloride to a scrub alloy of magnesium containing 35 weight percent zinc where the uranium chloride is reduced to metallic uranium which precipitates out in the magnesium-zinc alloy. The uranium reduction will proceed to 98.5 percent completion in one hour and 99.1 percent completion in four hours, which is nearly the chemical equilibrium limit. Ninety-nine percent of the uranium reduced will subsequently be transferred to the molten magnesium-zinc alloy.

Example II

A mixture of 5.68 kg. of $UO_2$, 150 g. of $MoO_3$, 150 g. of $CeO_2$ and 150 g. of $ZrO_2$ were reduced from suspension in a 30 mole percent $MgCl_2$, 30 mole percent NaCl and 40 mole percent KCl salt at 830° C. by a copper alloy containing 5½ weight percent magnesium, in a tungsten crucible and in an atmosphere of argon. The waste salt containing most of the MgO and cerium was transferred from the system. The reduced uranium was transported at 830° C. from the copper phase to a magnesium alloy containing 35 weight percent zinc via molten $MgCl_2$ salt by alternately contacting the salt with two liquid alloys. Mixing speeds of 650 r.p.m. and agitation periods of six minutes were used in each furnace. The temperature of the magnesium-zinc alloy was maintained at 795° C. during the run.

A uranium reduction of 92.5 percent was achieved. A recovery of 88 percent of the reduced uranium available for transfer was achieved after 14 cycles of the salt between the two alloys. Achievement of a higher uranium recovery is feasible but was prevented by a mechanical failure after the 14th cycle. Results also indicated that 99.0 weight percent of the zirconium present in the system remained in the copper-magnesium alloy, as did the molybdenum. The fact that there is separation of the uranium from the copper alloy proves the ability of the process to effect the separation of uranium from noble metals present as fission products.

It is to be understood that the invention is not limited to the details given herein, but that it may be modified within the scope of the appended claims.

The embodiments of the invention in which an exclusive property or privilege is claimed are defined as follows:

1. A process for the separation of uranium values from refractory metals and noble metals comprising: dissolving said values in a molten alloy of copper containing 4–8 percent magnesium, contacting said alloy with a molten salt containing an alkali metal chloride or an alkaline earth metal chloride to oxidize the uranium to uranium chloride which dissolves in the salt, and contacting the salt with a molten magnesium alloy to reduce the uranium chloride to uranium whicch precipitates in the molten magnesium alloy.

2. The process of claim 1 wherein the molten salt is magnesium chloride.

3. The process of claim 2 wherein the magnesium alloy contains 65 to 30 weight percent of zinc.

4. The process of claim 3 wherein the magnesium alloy contains 35 weight percent of zinc.

5. The process of claim 4 wherein the temperature is from 725° to 850° C.

6. The process of claim 4 wherein the temperature is 800° C.

7. The process of claim 1 wherein the atmosphere is inert.

References Cited by the Examiner

UNITED STATES PATENTS

| | | | |
|---|---|---|---|
| 2,934,425 | 4/1960 | Knighton et al. | 75—84.1 |
| 3,063,830 | 11/1962 | Martin et al. | 75—84.1 |
| 3,120,435 | 2/1964 | Chiotti | 75—84.1 |
| 3,148,975 | 9/1964 | Teitel et al. | 75—84.1 |
| 3,148,977 | 9/1964 | Teitel et al. | 75—84.1 |
| 3,154,408 | 10/1964 | Knighton et al. | 75—84.1 |
| 3,169,057 | 2/1965 | Knighton et al. | 75—84.1 |
| 3,218,160 | 11/1965 | Knighton et al. | 75—84.1 |

BENJAMIN R. PADGETT, *Primary Examiner.*

M. J. SCOLNICK, *Assistant Examiner.*